April 6, 1965     G. R. CHURCHILL     3,176,438
BUFFING WHEEL ASSEMBLY

Filed Oct. 10, 1961     3 Sheets-Sheet 1

INVENTOR
George R. Churchill
BY *Robert R. Churchill*
ATTORNEY

INVENTOR
George R. Churchill
BY Robert R. Churchill
ATTORNEY

April 6, 1965  G. R. CHURCHILL  3,176,438
BUFFING WHEEL ASSEMBLY
Filed Oct. 10, 1961  3 Sheets-Sheet 3

INVENTOR
George R. Churchill
BY Robert L. Churchill
ATTORNEY

ABSTRACT

United States Patent Office 3,176,438
Patented Apr. 6, 1965

3,176,438
BUFFING WHEEL ASSEMBLY
George R. Churchill, Cohasset, Mass., assignor to George R. Churchill Company, Inc., Hingham, Mass., a corporation of Massachusetts
Filed Oct. 10, 1961, Ser. No. 144,246
7 Claims. (Cl. 51—384)

This invention relates to a buffing wheel assembly.

The invention has for an object to provide a novel and improved buffing wheel assembly characterized by structure wherein the buffing element is detachably and replaceably secured to a supporting and retaining disk.

A further and more specific object of the invention is to provide a novel and improved assembly of a buffing wheel section wherein provision is made for detachably securing a ring of buffing material to a supporting retainer in a simple and economical manner whereby a worn ring of buffing material may be easily and quickly replaced in the assembly.

The invention has for a further object to provide a novel and improved method of assembling the present buffing wheel section.

With these general objects in view and such others as may hereinafter appear, the invention consists in the buffing wheel assembly, in the method of assembling a buffing wheel section and in the various structures, arrangements and combinations of parts hereinafter described and particularly defined in the claims at the end of this specification.

In the drawings illustrating the preferred embodiment of the invention:

In general the present invention contemplates a buffing wheel assembly for use as an individual section mounted and clamped on an arbor or for use in making a buffing setup wherein a plurality of individual sections are mounted on an arbor and clamped together to form a buffing surface of any desired width.

In general the present invention contemplates a novel and improved buffing wheel assembly embodying an annular ring of buffing material, a pronged center disk having an arbor hole adapted to fit the arbor of a buffing machine and a clamping member whereby the buffing wheel may be detachably assembled and disassembled in an economical, efficient and rapid manner, and the disk and clamping member reused in assembling other buffing wheels.

The present buffing wheel construction results in substantial savings in materials and labor over similar buffing wheels presently on the market, as will become apparent from the following description. The customer will only need to purchase in the initial order the centering disk assembly, and since the manufacturer is relieved of the cost of providing and assembling the centering assembly on subsequent orders the cost of the buffing wheels sent to the customer may be substantially reduced.

In accordance with the present invention provision is made for providing a reusable center disk assembly to which an annular ring of buffing material may be detachably secured whereby when the buffing material is worn down, the buffing wheel assembly may be easily and quickly disassembled, and the worn ring of buffing material may be removed and replaced by a new ring of material. In practice it is proposed that the customer be provided with the complete assembled buffing wheel section, including the center disk assembly on the first order, and on subsequent orders the customer will be provided with the annular rings of buffing material only so that the customer may replace his worn sections on the reusable detachable centering and supporting elements in his own factory. The customer may also be provided with simple apparatus for assembling the centering disk assembly and ring of buffing material in a simple and efficient manner.

Figure 1:
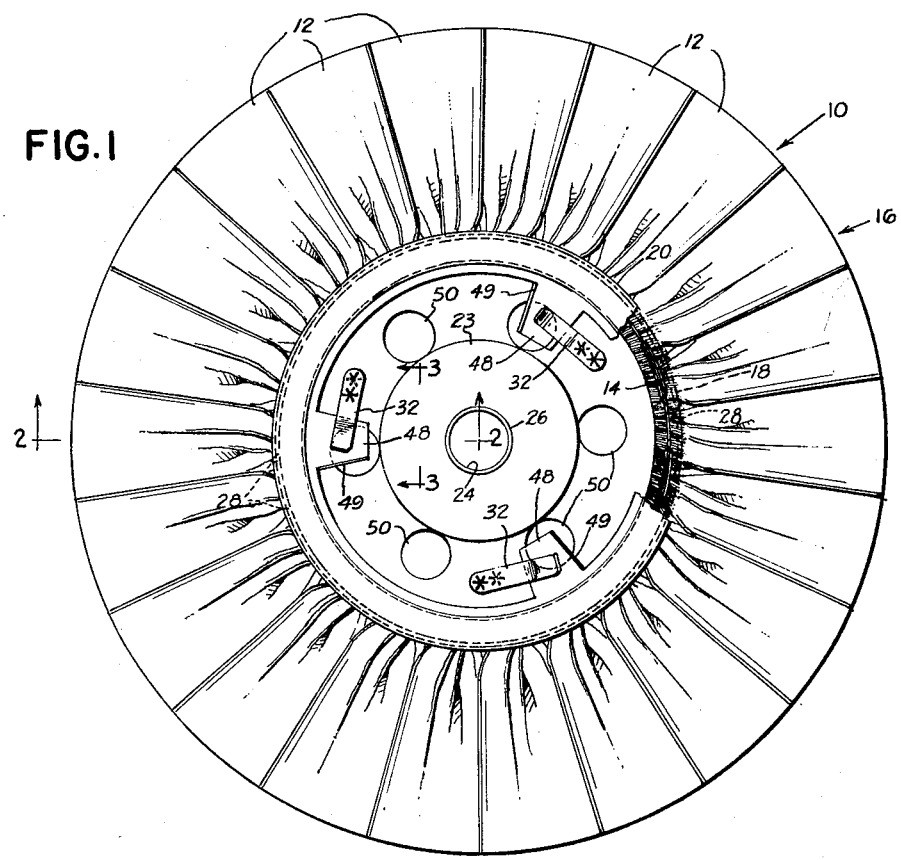
FIG. 1 is a front elevation of a buffing wheel section assembly embodying the present invention, a portion thereof being broken away.
Figure 2:
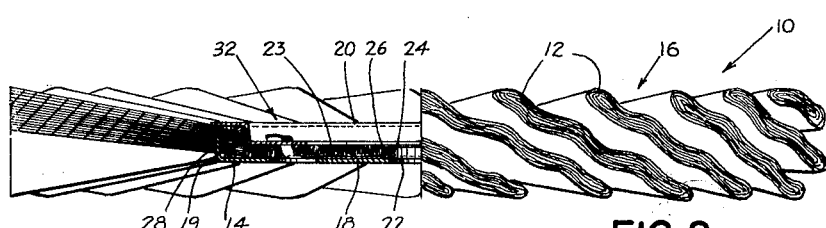
FIG. 2 is a side elevation of the same, one half thereof being shown in cross section, as taken on the line 2—2 of FIG. 1.
Figure 6:
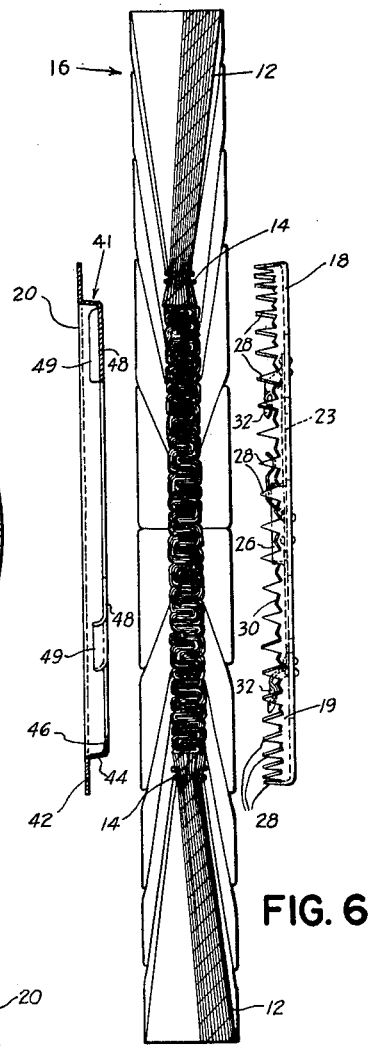
FIG. 6 is a side elevation of the parts in disassembled relation, some of the parts being shown in cross section.

Referring now to the drawings, and particularly to FIGS. 1 and 2, the present buffing wheel assembly, indicated generally at 10, comprises a closed ring of connected and radially extended flexible cloth buffing elements 12 which may be connected together adjacent their inner ends by weaving wires 14 woven around the individual buffing elements. In practice a length of connected buffing elements is formed into a circular shape and joined at its ends to form a closed ring comprising a buffing section 16. The illustrated buffing elements 12 comprise elongated and relatively wide multi-ply folded cloth buffing elements, the inner ends thereof being bunched together by the weaving wires to assume a closely pleated formation, as shown in FIG. 6, the free ends of the elements being flared outwardly and partaking a generally wavy contour at their outer ends as shown in FIG. 2. As also illustrated in FIG. 2, the free ends of the cloth buffing elements assume a generally angular position relative to the axis of rotation of the buffing wheel section and are arranged in overlapping relation to each other as shown.

Figure 4:
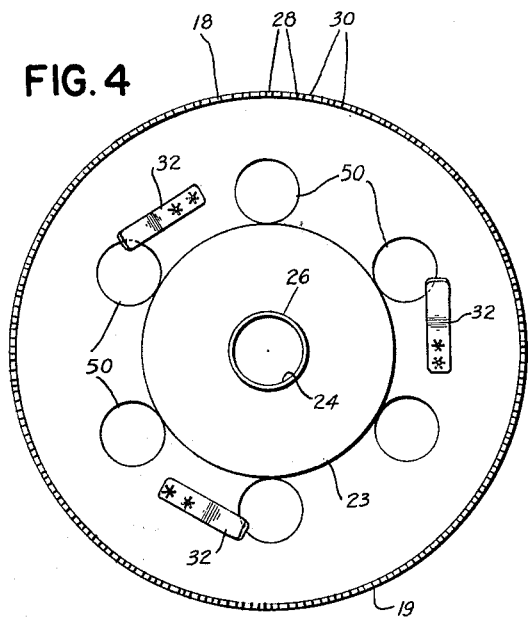
FIG. 4 is a detail view in front elevation of a pronged disk forming a part of the assembly.

As herein shown, provision is made for detachably supporting and retaining the buffing wheel section 16 thus produced by means of a toothed or pronged disk or plate 18 applied to one face of the annular ring of buffing material, and an annular clamping member 20 applied to the other face of the buffing wheel section and arranged to be detachably connected to the inner face of the disk 18. As illustrated in detail in FIGS. 4 and 6, the pronged disk 18 comprises a circular member of relatively heavy sheet metal, about $\frac{1}{16}$ of an inch or more in thickness, having a central opening 22 of a size such as to fit over an arbor, not shown, on which the completely assembled sections are mounted. The central portion of the disk 18 is provided with a smaller diameter concentric disk 23 of relatively thinner sheet metal, about $\frac{1}{32}$ of an inch or less in thickness, which may be spot welded to the disk 18 and is provided with a central opening 24 defined by an upstanding rim 26 concentrically aligned with the opening 22. The outer periphery of the circular disk 18 is bent at right angles to provide a laterally extended rim 19 in which a plurality of laterally extending, circumferentially spaced teeth or prongs 28 are cut. The circle of prongs 28 is adapted to be concentrically aligned with and forcibly pressed into one face of the annular ring buffing material section 16 in a circle immediately beyond the circle defined by the weaving wires 14. As shown in detail in FIG. 6, the teeth 28 are elongated and relatively sharp and are spaced apart a distance such as to provide between adjacent teeth 28 relatively short and wide angled teeth 30, the teeth 30 also engaging and pressing against the face of the cloth ring. It will be seen that the depth of the teeth 28 cut in the rim 19 is such as to leave an uncut portion of the rim between the base of the teeth and the disk for increased strength. Such uncut portion of the rim extends above the face of the annular ring of buffing material when the teeth are extended into the buffing material and also serves to provide in effect a spacer between adjacent buffing rings when a plurality of assembled sections are mounted on an arbor and clamped thereon, such spacing being of advantage for cooling purposes. In practice the teeth 28 may be straight or they may be inclined inwardly at a relatively slight angle so as to effect a slight gripping action on the buffing material into which they are pressed. However, the ends of the teeth are not bent over or clinched since it is desirable to effect easy separation of a worn ring of buffing material from the disk for salvage purposes and reuse in other forms and to replace the worn material with new material.

As thus assembled, the pronged disk 18 supports the flexible annular ring of buffing material 16 in its circular form and prevents outward radial displacement of the connected elongated buffing elements 12 during the buffing operation. It will be observed that the inner marginal portion of the cloth ring section 16 overlaps the outer periphery of the pronged disk 18 for a short distance. In practice the lengths of the teeth 28 are preferably such as to extend a substantial distance into the inner marginal portion of the ring, as indicated in FIG. 2, without passing through to the other side of the ring.

Figure 3:
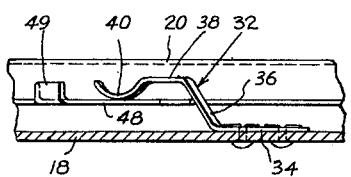
FIG. 3 is a cross sectional detail view taken on the line 3—3 of FIG. 1.
Figure 5:
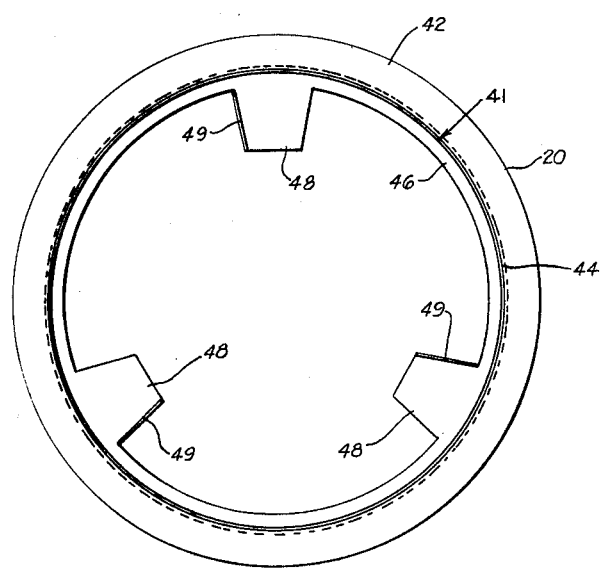
FIG. 5 is a detail view of a retaining disk adapted to cooperate with the pronged disk to detachably secure the parts in supporting relation to the buffing wheel ring.

The pronged disk 18 is further provided with a plurality of equally spaced spring metal clips 32, herein shown as three in number, each of which, as shown in detail in FIG. 3, is provided with a base portion 34 riveted or otherwise secured to the disk 18, an upwardly bent angular portion 36, a horizontal portion 38 and a downwardly and upwardly curved portion 40. The spaced clips 32 are arranged to cooperate with the annular clamping member 20 which, as shown in FIGS. 5 and 6, comprises a disk shaped member having a projecting circular portion 41 and an outer flange 42. The projecting portion 41 is defined by a side wall 44 which is provided with an inwardly extended relatively narrow flange 46. Extending radially inwardly from the inner flange 46 are three equally spaced ears 48. In assembling the clamping member 20 with the annular ring of buffing material 16, the projecting portion 41 is fitted snugly into the inner periphery of the ring section, with the outer flange 42 bearing against the adjacent face of the ring section and covering the weaving wires 14. The side wall 44 may be slightly tapered, as shown, to facilitate assembly. The clamping member 20 is initially applied with the spaced ears 48 occurring between the spaced clips 32 on the pronged disk 18, and by manually rotating the clamping member in one direction, herein shown as in a clockwise direction, the ears 48 are moved under the spring clips 32 to lock the disk and clamping member together and complete the assembly of the buffing wheel section. As thus assembled, the clamping member 20 resiliently retains the pronged disk 18 in assembled relation with the annular ring of buffing material, and in practice one or more of such assembled sections may be mounted side by side on an arbor and clamped thereon to provide a buffing surface of any desired width.

It will be observed that the pronged disk 18 is also provided with a plurality of circumferentially spaced openings 50, herein shown as six in number, to permit air to circulate through the inside of the plurality of sections mounted on the arbor for cooling purposes. It will also be observed that each ear 48 is provided with an upstanding edge portion 49 against which pressure may be applied for manually rotating the clamping member during the assembling operation. As thus constructed, it will be seen that when one or more buffing sections of a setup are worn down, the individual worn sections removed from the arbor may be easily and quickly disassembled by rotating the clamping member 20 in a counterclockwise direction, whereupon the worn material may be removed and replaced by new material.

Figure 7:
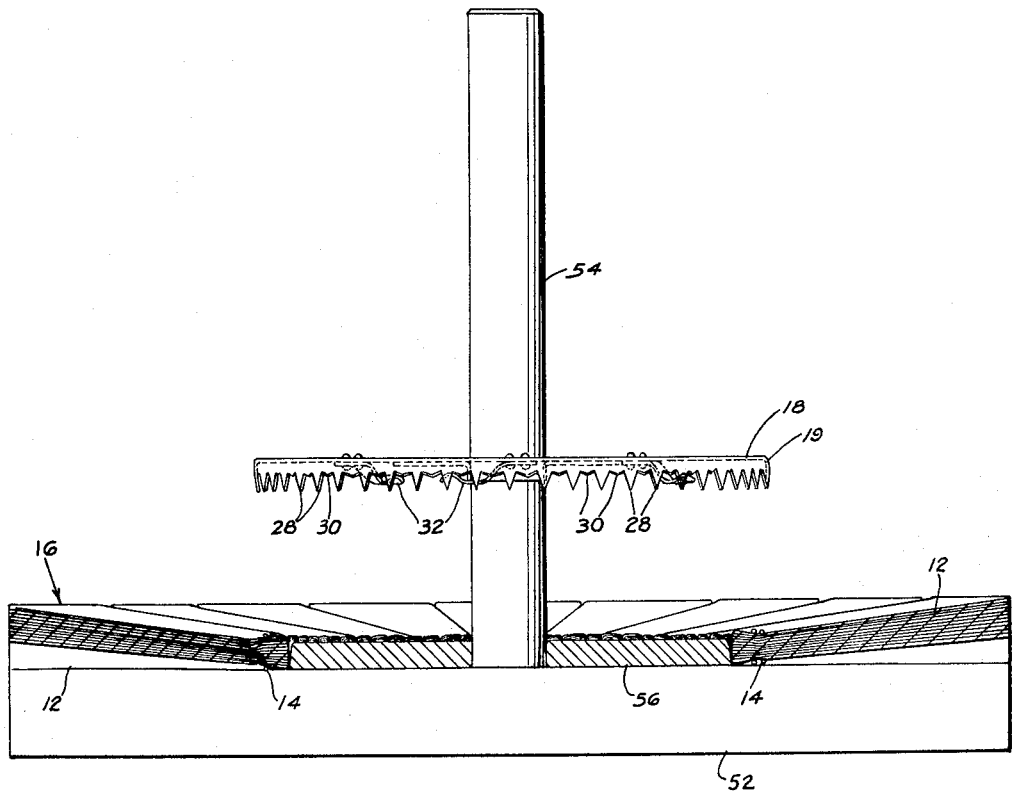
FIG. 7 is a view illustrating the preferred method of assembling the present buffing wheel section.

Referring now to FIG. 7 illustrating a preferred method of assembling the present buffing wheel section, 52 represents a platen having a central upstanding stud or arbor 54 which may be of the same diameter as the arbor on which the completely assembled sections are to be mounted. A centering disk 56 having an outside diameter of the same size as the inner periphery of the cloth ring 16 is placed over the arbor 54 to rest on the platen 52. The outer periphery of the centering disk may be slightly tapered as shown. The annular ring of buffing material 16 is then placed over the centering disk 56 to rest on the platen. The ring is thus centered relative to the central arbor 54, and the pronged disk 18 is then placed over the rod with the teeth facing downwardly engaging the upper face of the cloth ring. Sufficient pressure may then be applied to the outer face of the disk 18, either pneumatically or by a punch press, to press the teeth into the buffing material. Thereafter, the assembled unit is removed from the arbor 54, and the centering disk 56 is removed whereupon the clamping plate 20 is applied to the opposite face of the cloth ring and rotated to present the ears 48 under the clips 32, as described, to complete assembly of the buffing wheel unit.

While the buffing ring section 16, herein illustrated, comprises connected radially extended buffing elements it will be apparent that other types of annular buffing sections may be used, such as a ring of superimposed annular layers of cloth, or superimposed layers of cloth folded into a U-shape and formed into a ring. It will also be apparent that buffing or cutting materials other than cloth may also be used with equal advantage.

From the above description it will be seen that the present buffing wheel assembly provides a simple, efficient and economical structure for detachably supporting a flexible annular buffing element to be mounted on an arbor and clamped thereto. The present supporting structure may be economically produced and may be reused for supporting a new buffing ring when the first ring becomes worn, thus greatly reducing the overall cost to the consumer.

While the preferred embodiment of the invention has been herein illustrated and described, it will be understood that the invention may be embodied in other forms within the scope of the following claims.

Having thus described the invention, what is claimed is:

1. A buffing wheel assembly of the character described comprising an annular buffing element, and a reusable center disk assembly comprising a circular retaining disk having a central arbor opening and provided with a plurality of circumferentially spaced teeth extended laterally from the outer periphery of said disk, said teeth being extended into one face of the buffing element adjacent the inner marginal edge thereof and concentric therewith, and a flanged annular clamping member applied to the opposite face of the buffing element having a projecting portion fitted snugly within the inner periphery of the buffing element to align the clamping member concentrically with said buffing element, said clamping member having portions arranged to cooperate with portions of the retaining disk upon rotation of the clamping member to detachably support the parts in assembled relation whereby to permit easy disassembly and replacement of a worn buffing element.

2. A buffing wheel assembly as defined in claim 1 wherein the cooperating portions comprise circumferentially spaced spring clips secured to the inner face of the retaining disk, and radial, inwardly extended ears on said annular clamping member.

3. A buffing wheel assembly as defined in claim 1 wherein the cooperating portions comprise circumferentially spaced spring clips secured to the inner face of the retaining disk, and radial, inwardly extended ears on said annular clamping member, rotation of the clamping member in one direction presenting the ears under the spring clips to resiliently retain the parts in assembled relation, and rotation in the other direction effecting disassembly of the parts.

4. A buffing wheel assembly as defined in claim 1 wherein the retaining disk is provided with openings for circulation of air.

5. A buffing wheel assembly as defined in claim 1 wherein the circumferentially spaced teeth are formed in a laterally extended peripheral rim, said teeth being elongated and relatively widely spaced and cut at a relatively small angle to provide sharp pointed teeth, the rim portion between adjacent elongated teeth being cut to provide relatively short and wide angled teeth and to provide increased strength between adjacent teeth.

6. A buffing wheel assembly as defined in claim 1 wherein the annular buffing element comprises a closed ring of elongated and radially extended buffing elements connected together at their inner ends by weaving wires, the teeth of said retaining disk being disposed in a circle and extended into the buffing ring beyond the circle formed by the weaving wires.

7. A buffing wheel assembly of the character described comprising an annular buffing element, and a reusable center disk assembly comprising a circular retaining disk having a central arbor opening and provided with a plurality of circumferentially spaced teeth extended laterally from the outer periphery of said disk, said teeth being extended into one face of the buffing element adjacent the inner marginal edge thereof and concentric therewith, and a flanged annular clamping member applied to the opposite face of the buffing element having a projecting portion fitted within the inner periphery of the buffing element, said clamping member having portions arranged to cooperate with portions of the retaining disk upon rotation of the clamping member to detachably support the parts in assembled relation whereby to permit easy disassembly and replacement of a worn buffing element, said teeth being cut in a rim portion bent at right angles from the periphery of the disk, the length of the teeth being such as to leave a continuous uncut rim portion between the base of the teeth and the disk, said uncut portion of the rim extending beyond the face of the buffing ring in its assembled condition to serve as a strengthening rib and as a spacer between adjacent buffing rings when a plurality of assembled units are mouted on an arbor.

References Cited by the Examiner

UNITED STATES PATENTS

| | | | |
|---|---|---|---|
| 909,204 | 1/09 | Nielson | 15–179 |
| 1,106,833 | 8/14 | Painter | 51—193 |
| 1,922,108 | 8/33 | Meyers et al. | 51—193.1 |
| 2,522,093 | 9/50 | Churchill | 51—193 |
| 2,602,274 | 7/52 | Lawler | 51—193 |
| 2,608,035 | 8/52 | Tullo | 51—193.1 |
| 2,803,097 | 8/57 | Mockiewicz | 51—193 |
| 2,882,139 | 4/59 | Rock | 51—293 |
| 2,991,165 | 7/61 | Meyer et al. | 51—293 |

J. SPENCER OVERHOLSER, Primary Examiner.

LESTER M. SWINGLE, FRANK H. BRONAUGH, FRANK E. BAILEY, Examiners.